US012730908B2

(12) United States Patent
Blanc et al.

(10) Patent No.: US 12,730,908 B2
(45) Date of Patent: Sep. 8, 2026

(54) MATRIX TRANSPOSITION

(71) Applicant: STMicroelectronics International N.V., Geneva (CH)

(72) Inventors: Pierre-Alexandre Blanc, Evere (BE); Michael Peeters, Tourinnes-la-Grosse (BE)

(73) Assignee: STMicroelectronics International N.V., Geneva (CH)

( * ) Notice: Subject to any disclaimer, the term of this patent is extended or adjusted under 35 U.S.C. 154(b) by 59 days.

(21) Appl. No.: 18/982,626

(22) Filed: Dec. 16, 2024

(65) Prior Publication Data

US 2025/0217499 A1 Jul. 3, 2025

(30) Foreign Application Priority Data

Dec. 27, 2023 (FR) ...................................... 2315344

(51) Int. Cl.
*G06F 21/60* (2013.01)
*G06F 7/78* (2006.01)

(52) U.S. Cl.
CPC .............. *G06F 21/602* (2013.01); *G06F 7/78* (2013.01)

(58) Field of Classification Search
CPC ............................... G06F 21/60; G06F 21/602
See application file for complete search history.

(56) References Cited

U.S. PATENT DOCUMENTS

| | | | | |
|---|---|---|---|---|
| 9,485,087 | B2 * | 11/2016 | Van Assche | H04L 9/004 |
| 2017/0373830 | A1 * | 12/2017 | Wurcker | H04L 9/002 |
| 2018/0232209 | A1 * | 8/2018 | Ross | G11C 8/04 |
| 2021/0374209 | A1 * | 12/2021 | Ray | G06N 3/0495 |
| 2023/0350642 | A1 * | 11/2023 | Huang | G06F 7/78 |
| 2025/0217499 | A1 * | 7/2025 | Blanc | G06F 21/602 |

OTHER PUBLICATIONS

Hilewitz et al., "Performing Advanced Bit Manipulations Efficiently in General-Purpose Processors," 18th IEEE Symposium on Computer Arithmetic, 2007, 10 pages.
Chou et al., "McBits Revisited," International Association for Cryptologic Research 2017, pp. 213-231.

* cited by examiner

*Primary Examiner* — Ponnoreay Pich
(74) *Attorney, Agent, or Firm* — Seed IP Law Group LLP

(57) ABSTRACT

A cryptographic operation is protected. The protecting includes performing a matrix transformation operation on a matrix having n rows and n columns, each row forming a respective vector of a first set of ordered vectors. A second set of ordered vectors is generated by shifting values of vectors of the first set of ordered vectors in a first direction, wherein a pitch of a shift applied to a vector of the first set of ordered vectors is based on an order number of the vector of the first set of ordered vectors. A working vector is generated by logically combining vectors of the second set of ordered vectors. A third set of ordered vectors is generated based on the second set of ordered vectors. A fourth set of ordered vectors is generated based on the third set of ordered vectors and the working vector.

24 Claims, 3 Drawing Sheets

MATRIX TRANSPOSITION

BACKGROUND

Technical Field

The present disclosure generally concerns electronic circuits and devices, and more particularly the implementation, by an electronic circuit or device, of a matrix transposition method.

Description of the Related Art

In the field of data processing and encryption, it is common practice to use matrices and to apply different operations thereto.

A common operation applied to a matrix during computer processing is a transposition operation, during which the rows and the columns of said matrix are swapped.

BRIEF SUMMARY

An embodiment protects the data in processing operations during the application of a matrix transposition to a matrix as part of the processing operation. For example, an embodiment may protect a cryptographic operation using one or more matrix transformations against attacks, such as brute force or side channel attacks, for example, against attacks using quantum computing techniques to discover the values of the matrix used during the cryptographic operation.

In an embodiment, a method comprises performing a cryptographic operation using a processing device, and protecting the processing device during the performing of the cryptographic operation. The performing the cryptographic operation and the protecting including performing a matrix transformation operation on a matrix having n rows and n columns, where n is a positive integer, each row forming a respective vector of a first set of ordered vectors. The performing the matrix transformation operation includes: generating a second set of ordered vectors by shifting values of vectors of the first set of ordered vectors in a first direction, wherein a pitch of a shift applied to a vector of the first set of ordered vectors is based on an order number of the vector of the first set of ordered vectors; generating a working vector by logically combining vectors of the second set of ordered vectors; generating a third set of ordered vectors based on the second set of ordered vectors; and generating a fourth set of ordered vectors based on the third set of ordered vectors and the working vector.

In an embodiment, a device comprises memory and processing circuitry coupled to the memory. The processing circuitry, in operation, performs a cryptographic operation and protects the performing of the cryptographic operation. The performing the cryptographic operation and the protecting includes performing a matrix transformation operation on a matrix having n rows and n columns, where n is a positive integer, each row forming a respective vector of a first set of ordered vectors. The performing the matrix transformation operation includes: generating a second set of ordered vectors by shifting values of vectors of the first set of ordered vectors in a first direction, wherein a pitch of a shift applied to a vector of the first set of ordered vectors is based on an order number of the vector of the first set of ordered vectors; generating a working vector by logically combining vectors of the second set of ordered vectors; generating a third set of ordered vectors based on the second set of ordered vectors; and generating a fourth set of ordered vectors based on the third set of ordered vectors and the working vector.

In an embodiment, a system comprises a processor and cryptographic circuitry coupled to the processor. The cryptographic circuitry, in operation, performs a cryptographic operation and protects the performing of the cryptographic operation. The performing the cryptographic operation and the protecting includes performing a matrix transformation operation on a matrix having n rows and n columns, where n is a positive integer, each row forming a respective vector of a first set of ordered vectors. The performing the matrix transformation operation includes: generating a second set of ordered vectors by shifting values of vectors of the first set of ordered vectors in a first direction, wherein a pitch of a shift applied to a vector of the first set of ordered vectors is based on an order number of the vector of the first set of ordered vectors; generating a working vector by logically combining vectors of the second set of ordered vectors; generating a third set of ordered vectors based on the second set of ordered vectors; and generating a fourth set of ordered vectors based on the third set of ordered vectors and the working vector.

In an embodiment, a non-transitory computer-readable medium's contents cause cryptographic circuitry to perform a process. The process comprises performing a cryptographic operation and protecting the performing of the cryptographic operation. The performing the cryptographic operation and the protecting includes performing a matrix transformation operation on a matrix having n rows and n columns, where n is a positive integer, each row forming a respective vector of a first set of ordered vectors. The performing the matrix transformation operation includes: generating a second set of ordered vectors by shifting values of vectors of the first set of ordered vectors in a first direction, wherein a pitch of a shift applied to a vector of the first set of ordered vectors is based on an order number of the vector of the first set of ordered vectors; generating a working vector by logically combining vectors of the second set of ordered vectors; generating a third set of ordered vectors based on the second set of ordered vectors; and generating a fourth set of ordered vectors based on the third set of ordered vectors and the working vector.

BRIEF DESCRIPTION OF THE SEVERAL VIEWS OF THE DRAWINGS

Example features and advantages will be set out in detail in the following non-limiting description of particular embodiments in relation to the accompanying figures.

DETAILED DESCRIPTION

Like features have been designated by like references in the various figures. In particular, the structural and/or functional features that are common among the various embodiments may have the same references and may dispose identical structural, dimensional and material properties.

For clarity, only those steps and elements which are useful to the understanding of the described embodiments have been shown and are described in detail.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following description, where reference is made to absolute position qualifiers, such as "front," "back," "top," "bottom," "left," "right," etc., or relative position qualifiers, such as "top," "bottom," "upper," "lower," etc., or orientation qualifiers, such as "horizontal," "vertical," etc., reference is made unless otherwise specified to the orientation of the drawings.

Unless specified otherwise, the expressions "about," "approximately," "substantially," and "in the order of" signify plus or minus 10%, in an embodiment, plus or minus 5%.

The embodiments described hereafter concern the implementation of a matrix transposition. A matrix transposition operation is an operation during which the rows and the columns of an input matrix are inverted. The embodiments described hereafter further concern the implementation of a transposition operation providing masking operations, and thus enabling to securely take charge of a matrix to be transposed.

Figure 1:
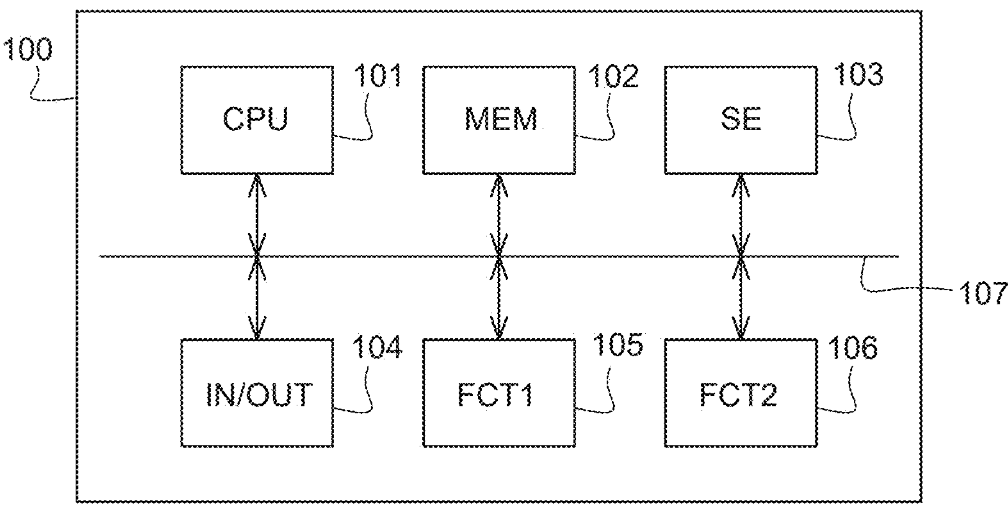
FIG. 1 shows, very schematically and in the form of blocks, an embodiment of an electronic device adapted to implementing the embodiments of FIGS. 4 and 5.

FIG. 1 is a block diagram showing, very schematically, an architecture of an example of an electronic device or system 100 adapted to implementing a matrix transposition method according to one or more of the embodiments disclosed herein.

According to an example, electronic device 100 comprises a processor 101 (CPU) adapted to implementing different processing of data stored in memories and/or supplied by other circuits of device 100. According to an embodiment, processor 101 is adapted to implementing a matrix transposition method. According to an embodiment, said processor 101 comprises registers and at least one arithmetic unit or circuit, which in operation, executes mathematical operations from data and/or vectors of data.

According to an example, electronic device 100 further comprises different types of memories 102 (MEM), including, for example, a non-volatile memory, a volatile memory 103, and/or a read-only memory. In an embodiment, each memory 102 is adapted to storing different types of data.

According to an example, electronic device 100 further comprises, for example, a secure element or circuit 103 (SE), which in operation, manipulates sensitive and/or secret data. Secure element 103 may comprise its own processor (s), its own memory or memories, etc. According to an embodiment, secure element 101 is adapted to implementing a matrix transposition method.

According to an example, electronic device 100 may further comprise interface circuits 104 (IN/OUT) adapted to sending and/or to receiving data originating from the outside of device 100. Interface circuits 104 may further be adapted to implementing a data display, for example, a display screen.

According to an example, electronic device 100 further comprises different circuits 105 (FCT1) and 106 (FCT2), which, in operation, perform different functions. As an example, circuits 105 and 106 may comprise measurement circuits, data conversion circuits, etc. According to an embodiment, circuits 105 and 106 may comprise a circuit adapted to implementing a matrix transposition method.

According to an example, electronic device 100 further comprises one or a plurality of data buses 107 adapted to transferring data between its different components.

According to an embodiment, each element of electronic device 100 capable of implementing a matrix transposition method comprises registers and at least one arithmetic unit or circuit capable to execute mathematical operations from data and/or vectors of data.

According to a specific example, electronic device 100 is adapted to implementing computer programs, and in particular a computer program enabling to implement a matrix transposition method.

Figure 2:
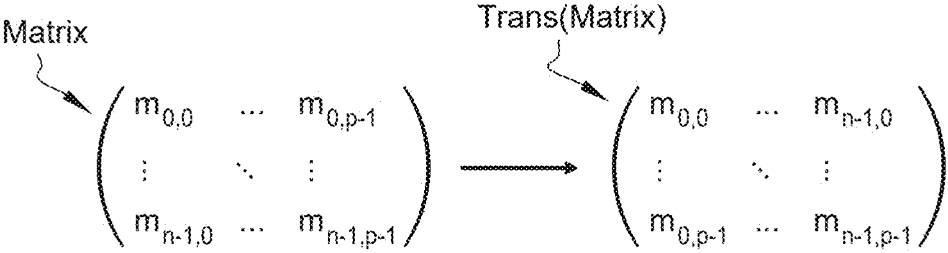
FIG. 2 shows, schematically, a matrix transposition operation.

FIG. 2 shows the application of a transposition operation Trans to a matrix Matrix.

Matrix Matrix is a matrix comprising n rows and p columns, n and p being integers greater than or equal to one. The elements, or coefficients, of matrix Matrix are noted $m_{i,j}$, i being an integer varying from 0 to p−1, and j being an integer varying from 0 to n−1. According to an embodiment, integers n and p are identical. According to an example embodiment, integer n is in the range from 1 to 20, for example is equal to 4, 6, or 16, and integer p is in the range from 1 to 40, for example is equal to 32.

Transposition operation Trans enables to provide a matrix Trans(Matrix) comprising p rows and n columns. The elements, or coefficients, of matrix Trans(Matrix) are noted $m'_{j,i}$, and given by:

$$m'_{j,i} = m_{i,j} \tag{1}$$

In other words, transposition operation Trans enables to swap the rows and columns of matrix Matrix. Still in other words, a vector representing a row of elements of index k of matrix Matrix comprises the same elements as a vector representing a column of index k of elements of matrix Trans(Matrix), k being an integer varying between 1 and n or p.

Figure 4:
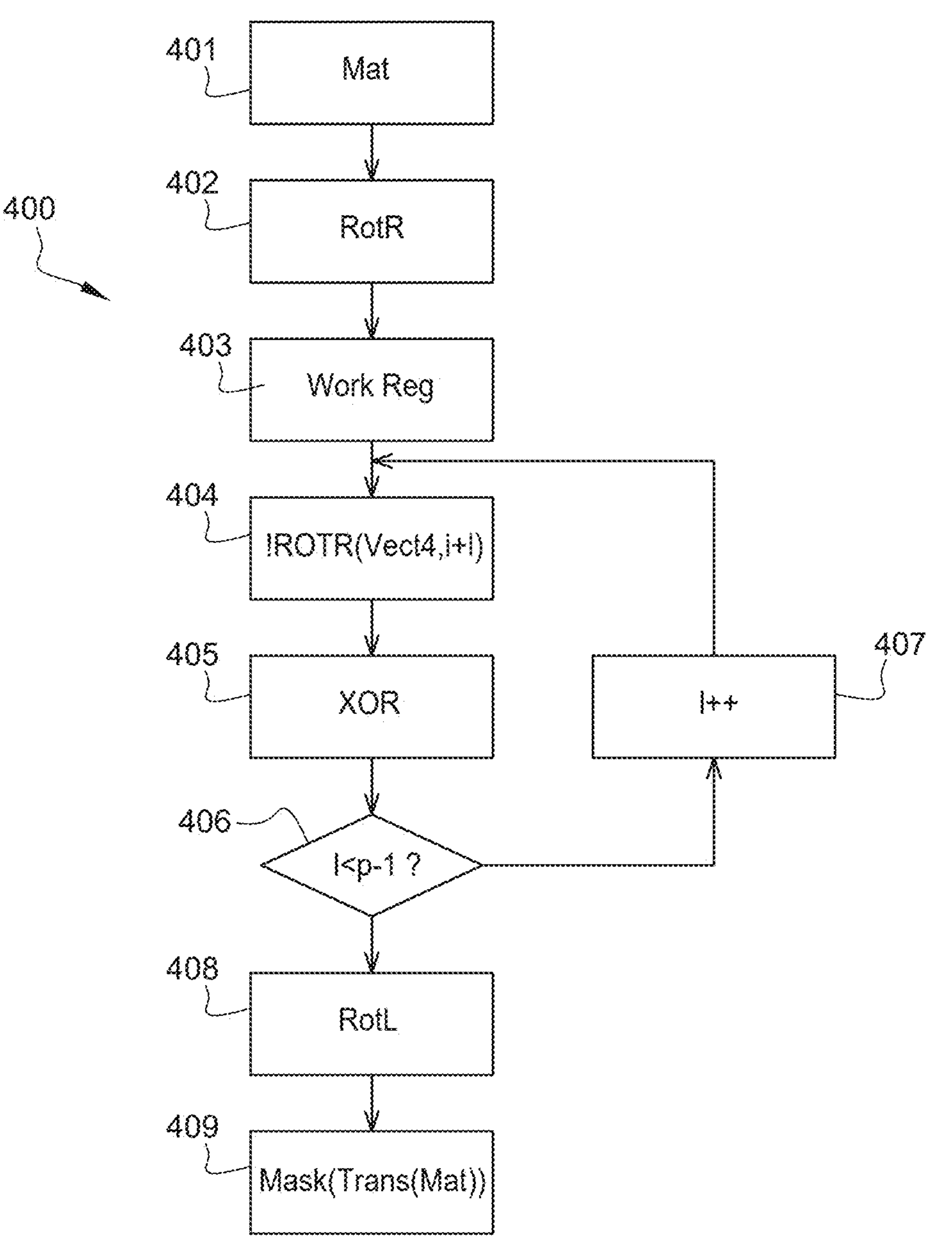
FIG. 4 shows a block diagram illustrating a first implementation mode of a matrix transposition method according to an embodiment.
Figure 5:
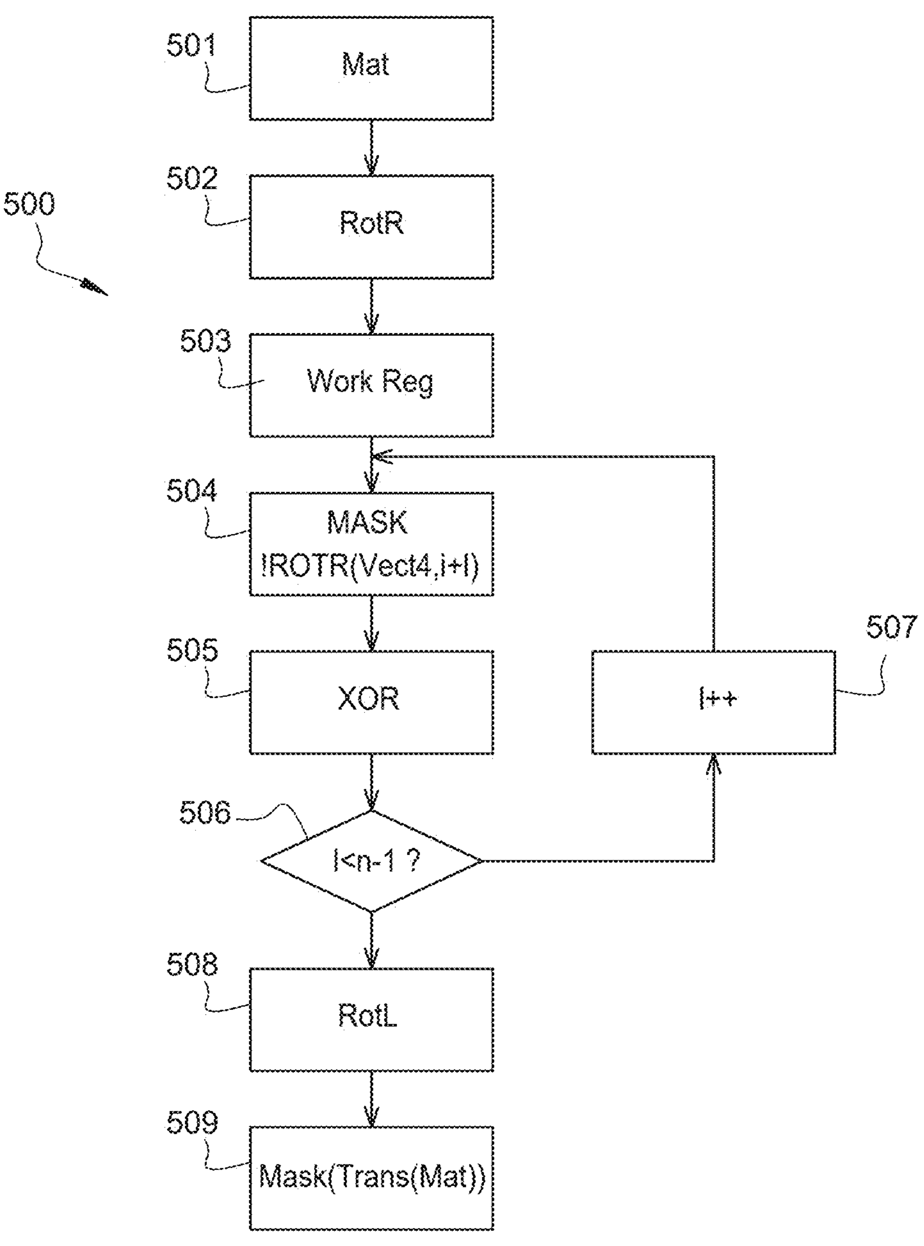
FIG. 5 shows a block diagram illustrating a second implementation mode of a matrix transposition method according to an embodiment.

The methods described in relation with FIGS. 4 and 5 illustrate practical implementations of a transposition operation of the type of transposition operation Trans.

Figure 3:
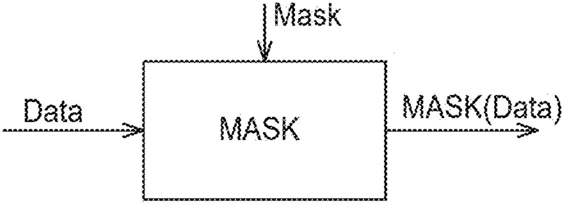
FIG. 3 shows, very schematically and in the form of blocks, a masking operation.

FIG. 3 shows, very schematically and in the form of blocks, an operation MASK of masking of a data item Data by a masking data item Mask.

According to an embodiment, data item Data is a binary data item representing a sensitive or secret data item, that is, a data item having a content which is not accessible to everyone, and/or having the access to its content restricted to an entity or to a group of entities.

According to an embodiment, masking data item Mask, or mask Mask, is a data item used to mask the content of data item Data. It is common practice to use pseudo-randomly or randomly generated data as a mask Mask.

There exists a plurality of types of masking operations. In an embodiment, the masking operation MASK described herein is a masking operation using the EXCLUSIVE OR (XOR) logic function, noted hereafter xor function.

According to an embodiment, the application of masking operation MASK enables to obtained a masked data item MASK (Data). Masked data item MASK (Data) is given by:

$$\text{MASK(Data)} = \text{Data}\ xor\ \text{Mask} \quad (2)$$

An operation of unmasking of the masked data item corresponds to the application, once again, of masking operation MASK. Indeed:

$$\text{MASK(MASK(Data))} = (\text{Data}\ xor\ \text{Mask})xor\ \text{Mask} = \text{Data} \quad (3)$$

FIG. 5 shows the implementation of a method of transposing a matrix having masked data. The application of the masking operation to a data matrix is detailed in relation with FIG. 5.

FIG. 4 is a block diagram illustrating a practical implementation mode of a method 400 executing an operation of transposition of a matrix of the type of the transposition operation Trans described in relation with FIG. 2. According to an embodiment, this method 400 may be implemented by the device 100 described in relation with FIG. 1, and, more particularly, by the processor and/or one of the circuits forming device 100.

To illustrate the operation of method 400, a matrix Mat of size 4×4 given by the following is considered:

$$Mat = \begin{pmatrix} A & B & C & D \\ E & F & G & H \\ I & J & K & L \\ M & N & O & P \end{pmatrix} \quad (4)$$

where elements A to P are data items.

Method 400 is also adapted to obtaining the transpose of a rectangular matrix of size n*p, of the type of the matrix Matrix described in relation with FIG. 2. It is sufficient, to achieve this, to divide the rectangular matrix into a plurality of square matrices and to apply method 400 to each square matrix, or to complete the rectangular matrix with empty elements to obtain square matrices. The abilities of those skilled in the art are sufficient to make the necessary adaptations in view of the explanations given below. The implementation of method 400 is detailed by considering hereafter only a square matrix Matrix where integers n and p are equal.

At an initial step 401 (Mat), and as previously mentioned, matrix Mat, having its data stored in registers in the form of four row vectors m[0], m[1], m[2], and m[3], each representing a row of matrix Mat, is considered. In other words, vectors m[0] to m[3] are given by:

$$\begin{cases} m[0] = (A, B, C, D) \\ m[1] = (E, F, G, H) \\ m[2] = (I, J, K, L) \\ m[3] = (M, N, O, P) \end{cases} \quad (5)$$

In the case of the matrix Matrix described in relation with FIG. 2, vectors m[i], i varying from 0 to n−1, are given by:

$$m[i] = (m_{i,0}, m_{i,1}, \ldots, m_{i,n-1}) \quad [6]$$

At a step 402 (RotR), successive to step 401, vectors x[0], x[1], x[2], and x[3] are generated from vectors m0, m1, m2, and m3 and are stored into registers. Vectors x[0] to x[3] are given by the following that are applied by a arithmetic unit or circuit:

$$\begin{cases} x[0] = ROTR(m[0], 0) = (A, B, C, D) \\ x[1] = ROTR(m[1], 1) = (H, E, F, G) \\ x[2] = ROTR(m[2], 2) = (K, L, I, J) \\ x[3] = ROTR(m[3], 3) = (N, O, P, M) \end{cases} \quad (7)$$

in which ROTR represents a function for shifting the elements of a vector to the right, its first argument corresponding to the vector having elements to be shifted, and its second argument corresponding to the shifting pitch, that is, to the integer added to the index of each element, modulo the number of elements comprised in the vector.

In the case of the matrix Matrix described in relation with FIG. 2, vectors x[i], i varying from 0 to n−1, are given by the following:

$$x[i] = ROTR(m[i], i) \quad (8)$$

At a step 403 (Work Reg), successive to step 402, a work vector w is generated from vectors x[0] to x[3] and stored into registers. Work vector w is given by the following that is applied by a arithmetic unit:

$$w = x[0]xor\ x[1]xor\ x[2]xor\ x[3] \quad (9)$$

In the case of the matrix Matrix described in relation with FIG. 2, work vector w is given by the following:

$$w = XOR_0^{n-1}x[i] = x[0]xor\ x[1]xor \ldots xor\ x[n-1] \quad (10)$$

where $$XOR_0^{n-1}$$

represents the successive application of the logic EXCLUSIVE OR function, or xor function, to a plurality of data items.

At a step 404 (!Vect(i)), successive to step 403, vectors z[0,1], z[1,1], z[2,1], and z[3,1] are generated from vectors x[0], x[1], x[2], and x[3], j being an integer varying between 0 and n−1, and are stored into registers. Vectors z[0,1] to z[3,1] are given by the following that are applied by a arithmetic unit:

$$\begin{cases} z[0, l] = x[0]\ \&!ROTR(Vect^4, l) = (0, B, C, D) \\ z[1, l] = x[1]\ \&!ROTR(Vect^4, 1+l) = (H, 0, F, G) \\ z[2, 1] = x[2]\ \&!ROTR(Vect^4, 2+l) = (K, L, 0, J) \\ z[3, l] = x[3]\ \&!ROTR(Vect^4, 3+l) = (N, O, P, 0) \end{cases} \quad (11)$$

In which:

& represents the logic AND function;

! represents the logic function enabling to obtain the complementary of a binary word, in other words ! enables to swap the elements of a vector representing a binary one and a binary zero;

$Vect^4$ is a unit vector of size 4 having its first element equal to one, and its other elements equal to zero;

and 1 being an integer varying from 0 to 3.

In particular, a unit vector is a vector having all its elements comprising a data item representing a binary zero, except for one element which comprises a data item representing a binary one. In particular, function ROTR($Vect^4$, i+l) is used to generate a unit vector of size 4 and having the index of its element comprising a data item representing a binary one given by the result of the sum of integers i and 1 modulo 4.

According to an embodiment, at the first occurrence of step 404, integer 1 is equal to zero. The conditions of incrementation of integer 1 are described hereafter.

In the case of the matrix Matrix described in relation with FIG. 2, vectors z[i, 1], i varying from 0 to n−1, are given by the following:

$$z[i, l] = x[i]\ \&!ROTR(Vect^n, i+l) \quad (12)$$

in which $Vect^n$ is a unit vector comprising n elements.

At a step 405 (XOR), successive to step 404, a vector y[1] is generated and stored in a register by using the following that is applied by a arithmetic unit:

$$y[l] = w\ xor\ z[0, l]\ xor\ z[1, l]\ xor\ z[2, l]\ xor\ z[3, l] \quad (13)$$

In the case where l is equal to zero, y[0] is given by the following:

$$y[0] = w\ xor\ z[0, 0]\ xor\ z[1, 0]\ xor\ z[2, 0]\ xor\ z[3, 0] = (A, E, I, M) \quad (14)$$

In the case of the matrix Matrix described in relation with FIG. 2, vector y[1] is given by the following:

$$y[l] = w\ xor\ XOR_0^{n-1} z[i, l] = w\ xor\ z[0, 0]\ xor\ z[1, 0]\ xor\ \ldots\ xor\ z[n-1, l] \quad (15)$$

At a step 406 (1<n−1?), successive to step 405, if the value of integer 1 used at step 405 is smaller than three then (output Y of step 406) the next step is a step 407 (1++), otherwise (output N of step 406) the next step is a step 408 (RotL).

In the case of the matrix Matrix of FIG. 2, the value of integer 1 is compared with n−1.

At step 407, successive to step 406, integer 1 is incremented by one unit, that is, by one.

At step 408, vectors v[0], v[1], v[2], and v[3] are generated from vectors y[0], y[1], y[2] and y[3] and stored into registers. Vectors v[0] to v[3] are given by the following that are applied by a arithmetic unit:

$$\begin{cases} v[0] = ROTL(y[0], 0) = (A, E, I, M) \\ v[1] = ROTL(y[1], 1) = (B, F, J, N) \\ v[2] = ROTL(y[2], 2) = (C, G, K, O) \\ v[3] = ROTL(y[3], 3) = (D, H, L, P) \end{cases} \quad (16)$$

in which ROTL represents a function for shifting the elements of a vector to the left, its first argument corresponding to the vector having its elements to be shifted, and its second argument corresponding to the shifting step, that is, to the subtraction of the integer to the index of each element modulo the number of elements included in a vector.

In the case of the matrix Matrix described in relation with FIG. 2, vector v[i] is given by the following:

$$v[i] = ROTL(y[i], i) \quad (17)$$

In a step 409 (Trans(Matrix)), successive to step 408, all vectors v[0], v[1], v[2], and v[3] have been generated and enable to obtain the transpose Trans(Mat) of matrix Mat. Indeed, vectors v[0], v[1], v[2], and v[3] represent all the rows of transpose Trans(Mat).

In the case of the matrix Matrix of FIG. 2, vectors v[i] form the rows of matrix Matrix.

An advantage of this implementation mode is that it enables to carry out a matrix transposition operation without for the data of the matrix to be transposed to be made accessible. Indeed, using work vector w enables to mask the data during the implementation of method 400.

FIG. 5 is a block diagram illustrating another practical implementation mode of a method 500 executing a matrix transposition operation of the type of the transposition operation Trans described in relation with FIG. 2. According to an embodiment, this method 500 may be implemented by the device 100 described in relation with FIG. 1, and, more particularly, by the processor and/or one of the circuits forming device 100.

Method 500 is similar to the method 400 described in relation with FIG. 4. Indeed, method 500 enables to implement a matrix transposition operation providing the transpose of the masked matrix as an output. To achieve this, the method comprises all the steps of method 400, and comprises a masking step detailed hereafter.

To illustrate the operation of method 500, and as for method 400, the matrix Mat of size 4×4 given by the following is considered again:

$$\text{Mat} = \begin{pmatrix} A & B & C & D \\ E & F & G & H \\ I & J & K & L \\ M & N & O & P \end{pmatrix} \quad (18)$$

Method 500 is also adapted to obtaining the transpose of a rectangular matrix of size n*p, of the type of the matrix Matrix described in relation with FIG. 2. It is sufficient, for this purpose, to divide the rectangular matrix into a plurality of square matrices and to apply method 500 to each square matrix, or to complete the rectangular matrix with empty elements to obtain square matrices. The abilities of those skilled in the art are sufficient to make the necessary adaptations in view of the explanations given hereafter. The implementation of method 500 is detailed by considering hereafter only a square matrix Matrix where integers n and p are equal.

At an initial step 501 (Mat), which can be identical to the step 401 of FIG. 4, the data of matrix Mat are stored into registers in the form of the four row vectors m[0], m[1], m[2], and m[3], each representing a row of matrix Mat. In other words, vectors m[0] to m[3] are given by the following:

$$\begin{cases} m[0] = (A, B, C, D) \\ m[1] = (E, F, G, H) \\ m[2] = (I, J, K, L) \\ m[3] = (M, N, O, P) \end{cases} \quad (19)$$

In the case of the matrix Matrix described in relation with FIG. 2, vectors m[i], i varying from 0 to n−1, are given by the following:

$$m[i] = (m_{i,0}, m_{i,1}, \ldots, m_{i,n-1}) \quad (20)$$

At a step 502 (RotR), which can be identical to step 402 and successive to step 501, vectors x[0], x[1], x[2], and x[3] are generated from vectors m0, m1, m2, and m3 and stored into registers. Vectors x[0] to x[3] are given by the following that are applied by a arithmetic unit or circuit:

$$\begin{cases} x[0] = ROTR(m[0], 0) = (A, B, C, D) \\ x[1] = ROTR(m[1], 1) = (H, E, F, G) \\ x[2] = ROTR(m[2], 2) = (K, L, I, J) \\ x[3] = ROTR(m[3], 3) = (N, O, P, M) \end{cases} \quad (21)$$

In the case of the matrix Matrix described in relation with FIG. 2, vectors x[i], i varying from 0 to n−1, are given by the following:

$$x[i] = ROTR(m[i], i) \quad (22)$$

At a step 503 (Work Reg), which can be identical to step 403 and successive to step 502, a work vector w is generated from vectors x[0] to x[3] and stored into registers. The work vector w is given by the following that are applied by a arithmetic unit or circuit:

$$w = x[0] \ xor \ x[1] \ xor \ x[2] \ xor \ x[3] \quad (23)$$

In the case of the matrix Matrix described in relation with FIG. 2, work vector w is given by the following:

$$w = XOR_0^{n-1} x[i] = x[0] \ xor \ x[1] \ xor \ \ldots \ xor \ x[n-1] \quad (24)$$

where $$XOR_0^{n-1}$$

represents the successive application of the logic EXCLUSIVE OR function, or xor function, to a plurality of data items.

At a step 504 (MASK!Vect(i)), successive to step 503, vectors z'[0,1], z'[1,1], z'[2,1], and z'[3,1] are generated from vectors x[0], x[1], x[2], and x[3], and from a mask r[1], 1 being an integer varying from 0 to n−1 and are stored into registers. Vectors z[0,1] to z[3,1] are given by the following that are applied by a arithmetic unit or circuit:

$$\begin{cases} z'[0, l] = (x[0] \ xor \ r[l]) \ \& \ !ROTR(Vect^4, l) = (0, B, C, D) \\ z'[1, l] = (x[1] \ xor \ r[l]) \ \& \ !ROTR(Vect^4, 1 + l) = (H, 0, F, G) \\ z'[2, l] = (x[2] xor \ r[l]) \ \& \ !ROTR(Vect^4, 2 + l) = (K, L, 0, J) \\ z'[3, l] = (x[3] xor \ r[l]) \ \& \ !ROTR(Vect^4, 3 + l) = (N, O, P, 0) \end{cases} \quad (25)$$

According to an embodiment, mask r[1] is a masking data item. According to an example, mask r[1] is randomly or pseudo-randomly generated. Mask r[1] is used at step 504 to mask vectors x[0], x[1], x[2], and x[3].

According to an embodiment, at the first occurrence of step 504, integer 1 is equal to zero. The conditions of incrementation of integer 1 are described hereafter.

In the case of the matrix Matrix described in relation with FIG. 2, vectors z'[i, 1], i varying from 0 to n−1, are given by the following:

$$z'[i, l] = (x[i] \ xor \ r[l]) \ \& \ ! \ ROTR(Vect^n, i + l) \quad (26)$$

At a step 505 (XOR), successive to step 504, a vector y'[1] is generated, and stored into registers, by using the following that is applied by a arithmetic unit or circuit:

$$y'[l] = w \ xor \ z'[0, l] \ xor \ z'[1, l] \ xor \ z'[2, l] \ xor \ z'[3, l] \quad (27)$$

In the case where 1 is equal to zero, y'[0] is given by the following:

$$y'[0] = w \ xor \ z'[0, 0] \ xor \ z'[1, 0] \ xor \ z'[2, 0] \ xor \ z'[3, 0] = (A, E, I, M) \quad (28)$$

In the case of the matrix Matrix described in relation with FIG. 2, vector y'[1] is given by the following:

$$y'[l] = w \ xor \ XOR_0^{n-1} z'[i, l] = w \ xor \ z'[0, 0] \ xor \ z'[1, 0] \ xor \ldots xor \ z'[n-1, l] \quad (29)$$

At a step 506 (1<n−1?), successive to step 505, if the value of the integer 1 used at step 505 is smaller than three then (output Y of step 506) the next step is a step 507 (i++), otherwise (output N of step 506) the next step is a step 508 (RotL).

In the case of the matrix Matrix of FIG. 2, the value of integer 1 is compared with n−1.

At step 507, successive to step 506, integer 1 is incremented by one unit, that is, by one.

At step 508, vectors v'[0], v'[1], v'[2], and v'[3] are generated from vectors y'[0], y'[1], y'[2], and y'[3]. Vectors v'[0] to v'[3] are given by the following:

$$\begin{cases} v'[0] = ROTL(y'[0], 0) = (A, E, I, M) \\ v'[1] = ROTL(y'[1], 1) = (B, F, J, N) \\ v'[2] = ROTL(y'[2], 2) = (C, G, K, O) \\ v'[3] = ROTL(y'[3], 3) = (D, H, L, P) \end{cases} \quad (30)$$

In the case of the matrix Matrix described in relation with FIG. 2, vector v'[i] is given by:

$$v'[i] = ROTL(y'[i], i) \quad (31)$$

In a final step 509 (Trans(Matrix)), successive to step 508, all vectors v'[0], v'[1], v'[2], and v'[3] have been generated and enable to obtain the transpose Trans(Mat) of matrix Mat, all the rows of which have been masked with a different mask, masks r[1]. Indeed, vectors v'[0], v'[1], v'[2], and v'[3] represent all the rows of transpose Trans(Mat).

In the case of the matrix Matrix of FIG. 2, vectors v'[i] form the rows of matrix Matrix.

An advantage of this implementation mode is that it enables to perform a matrix transposition operation without for the data of the matrix to be transposed to be made accessible. Indeed, using work vector w enables to mask the data during the implementation of method 500.

Another advantage of this implementation mode is that it enables to provide a masked matrix transpose.

An embodiment protects the data in processing operations during the application of a matrix transposition to a matrix as part of the processing operation. For example, an embodiment facilitates protecting a cryptographic operation against attacks using one or more matrix transformations, such as protecting against brute force or side channel attacks, for example, against attacks using quantum computing techniques to discover the values of the matrix used during the cryptographic operation.

Various embodiments and variants have been described. Those skilled in the art will understand that certain features of these various embodiments and variants may be combined, and other variants will occur to those skilled in the art.

Finally, the practical implementation of the described embodiments and variants is within the abilities of those skilled in the art based on the functional indications given hereabove.

In an embodiment, a method (400; 500), is by an electronic device, of transposing a matrix (Mat) including n rows and n columns, each row of said matrix (Mat) forming a first vector m[i], i being an integer varying from 0 to n−1, said first vectors being stored in a first register of the electronic device. The method comprising the following successive steps:

(a) Obtaining second vectors x[i] by shifting to the right each first vector m[i] by a pitch corresponding to the number of said row;

(b) Generating a second vector w, stored in second register of the electronic device, by using a arithmetic unit of the electronic device to apply the following:

$$w = XOR_0^{n-1}(x[i]), \quad (32)$$

wherein function $$XOR_0^{n-1}$$

corresponds to the successive application of the logic EXCLUSIVE OR function to a plurality of data items;

(c) Generating third vectors z[i, 1], 1 being an integer varying from 0 to n−1, stored in third registers of the electronic device, by using a arithmetic unit of the electronic device to apply the following for each value of i:

$$z[i, l] = x[i] \ \& \ !\ ROTR(Vect^n, i + l), \quad (33)$$

wherein:

& represents the logic AND function;

! represents the logic function enabling to obtain the complementary of a binary data item;

ROTR($Vect^n$, i+l) represents a unit vector having all its elements equal to zero except for the element of rank i+l, which is equal to one; and (d) Generating a fourth vector v[1], representing a row of the transpose of matrix A, stored in a fourth register of the electronic device, by using said arithmetic unit to apply the following:

$$v[l] = ROTL(w \ xor \ XOR_1^n(z[i, l])), \quad (34)$$

wherein:

ROTL represents a leftward shift function;

xor represents the logic EXCLUSIVE OR function, wherein steps (c) and (d) are repeated for all values of 1.

In an embodiment, an electronic device adapted to implementing a method (400; 500) of transposition of a matrix (Mat) including n rows and p columns, each row of said matrix (Mat) forming a first vector m[i], i being an integer varying from 0 to n−1, said first vectors being stored in a first register of the electronic device, the method comprising the following successive steps:

(a) Obtaining second vectors x[i] by shifting to the right each first vector m[i] by a pitch corresponding to the number of said row;

(b) Generating a second vector w, stored in second register of the electronic device, by using a arithmetic unit of the electronic device to apply the following:

$$w = XOR_0^{n-1}(x[i]), \quad (35)$$

wherein function $$XOR_0^{n-1}$$

corresponds to the successive application of the logic EXCLUSIVE OR function to a plurality of data items;

(c) Generating third vectors z[i, 1], 1 being an integer varying from 0 to n−1, stored in third registers of the electronic device, by using a arithmetic unit of the electronic device to apply the following for each value of i:

$$z[i, l] = x[i] \ \& \ !ROTR(Vect^n, i + l), \quad (36)$$

wherein:

& represents the logic AND function;

! represents the logic function enabling to obtain the complementary of a binary data item;

ROTR($Vect^n$, i+l) represents a unit vector having all its elements equal to zero except for the element of rank i+l, which is equal to one; and (d) Generating a fourth vector v[1], representing a row of the transpose of matrix A, stored in a fourth register of the electronic device, by using said arithmetic unit to apply the following:

$$v[l] = ROTL(w \ xor \ XOR_1^n(z[i, l])), \quad (37)$$

wherein:

ROTL represents a leftward shift function;

xor represents the logic EXCLUSIVE OR function, wherein steps (c) and (d) are repeated for all values of 1.

In an embodiment, the method comprises masking operations.

In an embodiment, a masking operation includes applying an xor function.

In an embodiment, the method includes a step (e) of masking of the second vectors x[i] implemented during step (c).

In an embodiment, at step (c), third masked vectors z'[i, 1] are generated by applying the following for each value of i:

$$z[i, l] = (x[i] \ xor \ r[l]) \ \& \ !Vect(i + l), \quad (38)$$

where r[1] is a mask.

In an embodiment, mask r[1] is randomly generated.

In an embodiment, integers n and p are equal.

In an embodiment, integer n is in a range from 1 to 20.

In an embodiment, a method comprises performing a cryptographic operation using a processing device, and protecting the processing device during the performing of the cryptographic operation. The performing the cryptographic operation and the protecting including performing a matrix transformation operation on a matrix having n rows and n columns, where n is a positive integer, each row forming a respective vector of a first set of ordered vectors. The performing the matrix transformation operation includes: generating a second set of ordered vectors by shifting values of vectors of the first set of ordered vectors in a first direction, wherein a pitch of a shift applied to a vector of the first set of ordered vectors is based on an order number of the vector of the first set of ordered vectors; generating a working vector by logically combining vectors of the second set of ordered vectors; generating a third set of ordered vectors based on the second set of ordered vectors; and generating a fourth set of ordered vectors based on the third set of ordered vectors and the working vector.

In an embodiment, the matrix is a sub-matrix of a larger matrix transposed as part of the performing of the cryptographic operation and the protecting, the larger matrix having more than n rows, more than n columns, or more than n rows and more than n columns.

In an embodiment, the matrix is an augmented matrix of a second matrix transposed as part of the performing of the cryptographic operation and the protecting, the second matrix having less than n rows, less than n columns, or less than n rows and less than n columns.

In an embodiment, generating the second set of ordered vectors includes shifting values of vectors of the first set of ordered vectors to the right.

In an embodiment, the working vector is generated by successively applying an EXCLUSIVE OR function to vectors of the second set of ordered vectors.

In an embodiment, the third set of ordered vectors is generated according to:

$$z[i, l] = x[i] \ \& \ !ROTR(Vect^n, i + l), \quad (39)$$

wherein: z[i, 1] represents a value in position 1 of an ith vector of the third set of ordered vectors; & represents a logic AND function; ! represents a logic NOT function; and ROTR($Vect^n$, i+l) represents a unit vector having elements equal to zero except for an element of rank i+l, which is equal to one.

In an embodiment, the fourth set of ordered vectors is generated according to:

$$v[l] = ROTL(w \ xor \ XOR_1^n(z[i, l])),$$

wherein: v[l] represents a vector of the fourth set of ordered vectors; ROTL represents a leftward shift function; and xor represents a logic EXCLUSIVE OR function.

In an embodiment, the performing the matrix transformation operation includes performing a masking operation.

In an embodiment, the masking operation includes application of an EXCLUSIVE OR function.

In an embodiment, the masking operation comprises masking of vectors of the second set of ordered vectors.

In an embodiment, the masking operation comprises randomly generating a mask.

In an embodiment, n is an integer having a range of 1 to 20.

In an embodiment, a device comprises memory and processing circuitry coupled to the memory. The processing circuitry, in operation, performs a cryptographic operation and protects the performing of the cryptographic operation. The performing the cryptographic operation and the protecting includes performing a matrix transformation operation on a matrix having n rows and n columns, where n is a positive integer, each row forming a respective vector of a first set of ordered vectors. The performing the matrix transformation operation includes: generating a second set of ordered vectors by shifting values of vectors of the first set of ordered vectors in a first direction, wherein a pitch of a shift applied to a vector of the first set of ordered vectors is based on an order number of the vector of the first set of ordered vectors; generating a working vector by logically combining vectors of the second set of ordered vectors; generating a third set of ordered vectors based on the second set of ordered vectors; and generating a fourth set of ordered vectors based on the third set of ordered vectors and the working vector.

In an embodiment, the matrix is a sub-matrix of a larger matrix transposed as part of the performing of the cryptographic operation and the protecting, the larger matrix having more than n rows, more than n columns, or more than n rows and more than n columns.

In an embodiment, the matrix is an augmented matrix of a second matrix transposed as part of the performing of the cryptographic operation and the protecting, the second matrix having less than n rows, less than n columns, or less than n rows and less than n columns.

In an embodiment, the second set of ordered vectors is generated by shifting values of vectors of the first set of ordered vectors to the right.

In an embodiment, the working vector is generated by successively applying an EXCLUSIVE OR function to vectors of the second set of ordered vectors.

In an embodiment, the performing the matrix transformation operation includes performing a masking operation.

In an embodiment, a system comprises a processor and cryptographic circuitry coupled to the processor. The cryptographic circuitry, in operation, performs a cryptographic operation and protects the performing of the cryptographic operation. The performing the cryptographic operation and the protecting includes performing a matrix transformation operation on a matrix having n rows and n columns, where n is a positive integer, each row forming a respective vector of a first set of ordered vectors. The performing the matrix transformation operation includes: generating a second set of ordered vectors by shifting values of vectors of the first set of ordered vectors in a first direction, wherein a pitch of a shift applied to a vector of the first set of ordered vectors is based on an order number of the vector of the first set of ordered vectors; generating a working vector by logically combining vectors of the second set of ordered vectors; generating a third set of ordered vectors based on the second set of ordered vectors; and generating a fourth set of ordered vectors based on the third set of ordered vectors and the working vector.

In an embodiment, the cryptographic circuitry, in operation, generates a result of the cryptographic operation based on the fourth set of ordered vectors; and the processor, in operation, executes an application using the result of the cryptographic operation.

In an embodiment, the second set of ordered vectors is generated by shifting values of vectors of the first set of ordered vectors to the right.

In an embodiment, the performing the matrix transformation operation includes performing a masking operation.

In an embodiment, a non-transitory computer-readable medium's contents cause cryptographic circuitry to perform a process. The process comprises performing a cryptographic operation and protecting the performing of the cryptographic operation. The performing the cryptographic operation and the protecting includes performing a matrix transformation operation on a matrix having n rows and n columns, where n is a positive integer, each row forming a respective vector of a first set of ordered vectors. The performing the matrix transformation operation includes: generating a second set of ordered vectors by shifting values of vectors of the first set of ordered vectors in a first direction, wherein a pitch of a shift applied to a vector of the first set of ordered vectors is based on an order number of the vector of the first set of ordered vectors; generating a working vector by logically combining vectors of the second set of ordered vectors; generating a third set of ordered vectors based on the second set of ordered vectors; and generating a fourth set of ordered vectors based on the third set of ordered vectors and the working vector. In an embodiment, the contents comprise instructions executable by the cryptographic circuitry.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:

performing a cryptographic operation using a processing device; and protecting the processing device during the performing of the cryptographic operation, the performing the cryptographic operation and the protecting including performing a matrix transformation operation on a matrix having n rows and n columns, where n is a positive integer, each row forming a respective vector of a first set of ordered vectors, the performing the matrix transformation operation including:

generating a second set of ordered vectors by shifting values of vectors of the first set of ordered vectors in a first direction, wherein a pitch of a shift applied to a vector of the first set of ordered vectors is based on an order number of the vector of the first set of ordered vectors;

generating a working vector by logically combining vectors of the second set of ordered vectors;

generating a third set of ordered vectors based on the second set of ordered vectors; and generating a fourth set of ordered vectors based on the third set of ordered vectors and the working vector.

2. The method of claim 1, wherein the matrix is a sub-matrix of a larger matrix transposed as part of the performing of the cryptographic operation and the protecting, the larger matrix having more than n rows, more than n columns, or more than n rows and more than n columns.

3. The method of claim 1, wherein the matrix is an augmented matrix of a second matrix transposed as part of the performing of the cryptographic operation and the protecting, the second matrix having less than n rows, less than n columns, or less than n rows and less than n columns.

4. The method of claim 1, wherein the generating the second set of ordered vectors includes shifting values of vectors of the first set of ordered vectors to the right.

5. The method of claim 1, wherein the working vector is generated by successively applying an EXCLUSIVE OR function to vectors of the second set of ordered vectors.

6. The method of claim 5, comprising generating the third set of ordered vectors according to:

$$z[i, l] = x[i] \ \& \ !ROTR(Vect^n, i+l), \tag{40}$$

wherein:

z[i, l] represents a value in position l of an ith vector of the third set of ordered vectors;

& represents a logic AND function;

! represents a logic NOT function; and

ROTR($Vect^n$, i+l) represents a unit vector having elements equal to zero except for an element of rank i+l, which is equal to one.

7. The method of claim 6, comprising generating the fourth set of ordered vectors according to:

$$v[l] = ROTL(w \ xor \ XOR_1^n(z[i, l])),$$

wherein:

v[l] represents a vector of the fourth set of ordered vectors;

ROTL represents a leftward shift function; and xor represents a logic EXCLUSIVE OR function.

8. The method of claim 1, wherein the performing the matrix transformation operation includes performing a masking operation.

9. The method of claim 8, wherein the masking operation includes application of an EXCLUSIVE OR function.

10. The method of claim 8, wherein the masking operation comprises masking of vectors of the second set of ordered vectors.

11. The method of claim 10, wherein the masking operation comprises randomly generating a mask.

12. The method of claim 1, wherein n is an integer having a range of 1 to 20.

13. A device, comprising:

memory; and processing circuitry coupled to the memory, wherein the processing circuitry, in operation, performs a cryptographic operation and protects the performing of the cryptographic operation, the performing the cryptographic operation and the protecting including performing a matrix transformation operation on a matrix having n rows and n columns, where n is a positive integer, each row forming a respective vector of a first set of ordered vectors, the performing the matrix transformation operation including:

generating a second set of ordered vectors by shifting values of vectors of the first set of ordered vectors in a first direction, wherein a pitch of a shift applied to a vector of the first set of ordered vectors is based on an order number of the vector of the first set of ordered vectors;

generating a working vector by logically combining vectors of the second set of ordered vectors;

generating a third set of ordered vectors based on the second set of ordered vectors; and generating a fourth set of ordered vectors based on the third set of ordered vectors and the working vector.

14. The device of claim 13, wherein the matrix is a sub-matrix of a larger matrix transposed as part of the performing of the cryptographic operation and the protecting, the larger matrix having more than n rows, more than n columns, or more than n rows and more than n columns.

15. The device of claim 13, wherein the matrix is an augmented matrix of a second matrix transposed as part of the performing of the cryptographic operation and the protecting, the second matrix having less than n rows, less than n columns, or less than n rows and less than n columns.

16. The device of claim 13, wherein the second set of ordered vectors is generated by shifting values of vectors of the first set of ordered vectors to the right.

17. The device of claim 13, wherein the working vector is generated by successively applying an EXCLUSIVE OR function to vectors of the second set of ordered vectors.

18. The device of claim 13, wherein the performing the matrix transformation operation includes performing a masking operation.

19. A system, comprising:

a processor; and cryptographic circuitry coupled to the processor, wherein the cryptographic circuitry, in operation, performs a cryptographic operation and protects the performing of the cryptographic operation, the performing the cryptographic operation and the protecting including performing a matrix transformation operation on a matrix having n rows and n columns, where n is a positive integer, each row forming a respective vector of a first set of ordered vectors, the performing the matrix transformation operation including:

generating a second set of ordered vectors by shifting values of vectors of the first set of ordered vectors in a first direction, wherein a pitch of a shift applied to a vector of the first set of ordered vectors is based on an order number of the vector of the first set of ordered vectors;

generating a working vector by logically combining vectors of the second set of ordered vectors;

generating a third set of ordered vectors based on the second set of ordered vectors; and generating a fourth set of ordered vectors based on the third set of ordered vectors and the working vector.

20. The system of claim 19, wherein, the cryptographic circuitry, in operation, generates a result of the cryptographic operation based on the fourth set of ordered vectors; and the processor, in operation, executes an application using the result of the cryptographic operation.

21. The system of claim 19, wherein the second set of ordered vectors is generated by shifting values of vectors of the first set of ordered vectors to the right.

22. The system of claim 19, wherein the performing the matrix transformation operation includes performing a masking operation.

23. A non-transitory computer-readable medium having contents which cause cryptographic circuitry to perform a process, the process comprising:

performing a cryptographic operation; and protecting the performing of the cryptographic operation, the performing the cryptographic operation and the protecting including performing a matrix transformation operation on a matrix having n rows and n columns, where n is a positive integer, each row forming a respective vector of a first set of ordered vectors, the performing the matrix transformation operation including:

generating a second set of ordered vectors by shifting values of vectors of the first set of ordered vectors in a first direction, wherein a pitch of a shift applied to a vector of the first set of ordered vectors is based on an order number of the vector of the first set of ordered vectors;

generating a working vector by logically combining vectors of the second set of ordered vectors;

generating a third set of ordered vectors based on the second set of ordered vectors; and generating a fourth set of ordered vectors based on the third set of ordered vectors and the working vector.

24. The non-transitory computer-readable medium of claim 23, wherein the contents comprise instructions executable by the cryptographic circuitry.

* * * * *